United States Patent [19]

Arvanitakis

[11] 4,410,433

[45] Oct. 18, 1983

[54] VERTICAL FILTER SYSTEM

[76] Inventor: Kostas S. Arvanitakis, 14945 S. Dogwood, Orland Park, Ill. 60462

[21] Appl. No.: 226,870

[22] Filed: Jan. 21, 1981

Related U.S. Application Data

[63] Continuation of Ser. No. 809,119, Jun. 22, 1977, abandoned.

[51] Int. Cl.³ ............................................. B01D 37/02
[52] U.S. Cl. .................................... 210/778; 210/111; 210/193
[58] Field of Search ............... 210/777, 778, 104, 111, 210/193, 332, 107, 112, 408

[56] References Cited

U.S. PATENT DOCUMENTS

| | | | |
|---|---|---|---|
| 3,200,105 | 8/1965 | Barber et al. | 210/75 X |
| 3,578,163 | 5/1971 | Warning | 210/75 |
| 3,705,649 | 12/1972 | Arvanitakis | 210/777 X |
| 3,815,745 | 6/1974 | Bondarev et al. | 210/104 X |

*Primary Examiner*—Frank A. Spear, Jr.
*Attorney, Agent, or Firm*—FitzGibbon, Roehrig, Grennawalt & Stone

[57] ABSTRACT

A filtration system utilizing a plurality coaxial, vertically disposed, filter elements for clarifying a liquid passed therethrough. Upon the accumulation of a predetermined amount of materials on or in the filter cake, the filter chamber is sealed and the contents drained creating a pressure differential across the filter elements to maintain the integrity of the filter cake on the filter septum. After the contents of the filter chamber have been drained the chamber is positively pressurized to remove any filtrate remaining in the filter cake and to dry the filter cake on the filter septum prior to removal. The expended filter cake and accumulants are removed from the filter septum and conveyed from the filter chamber by a discharge system. The filter chamber is filled with liquid and the filter septum mechanically scrubbed to remove any residual materials therefrom. A quantity of precoat or filter aid material is added to the liquid in the filter chamber and the filter aid bearing liquid circulated through the filter elements and the filtration system in a closed loop to form a precoat filter cake on the filter septum. The flow rate of the circulation is sufficient to maintain the integrity of the filter cake so formed until such time as the filter cake removes a sufficient amount of accumulants from the influent to create a predetermined pressure differential thereacross which will maintain the integrity of the filter cake on the filter septum at the influent flow rate.

8 Claims, 5 Drawing Figures

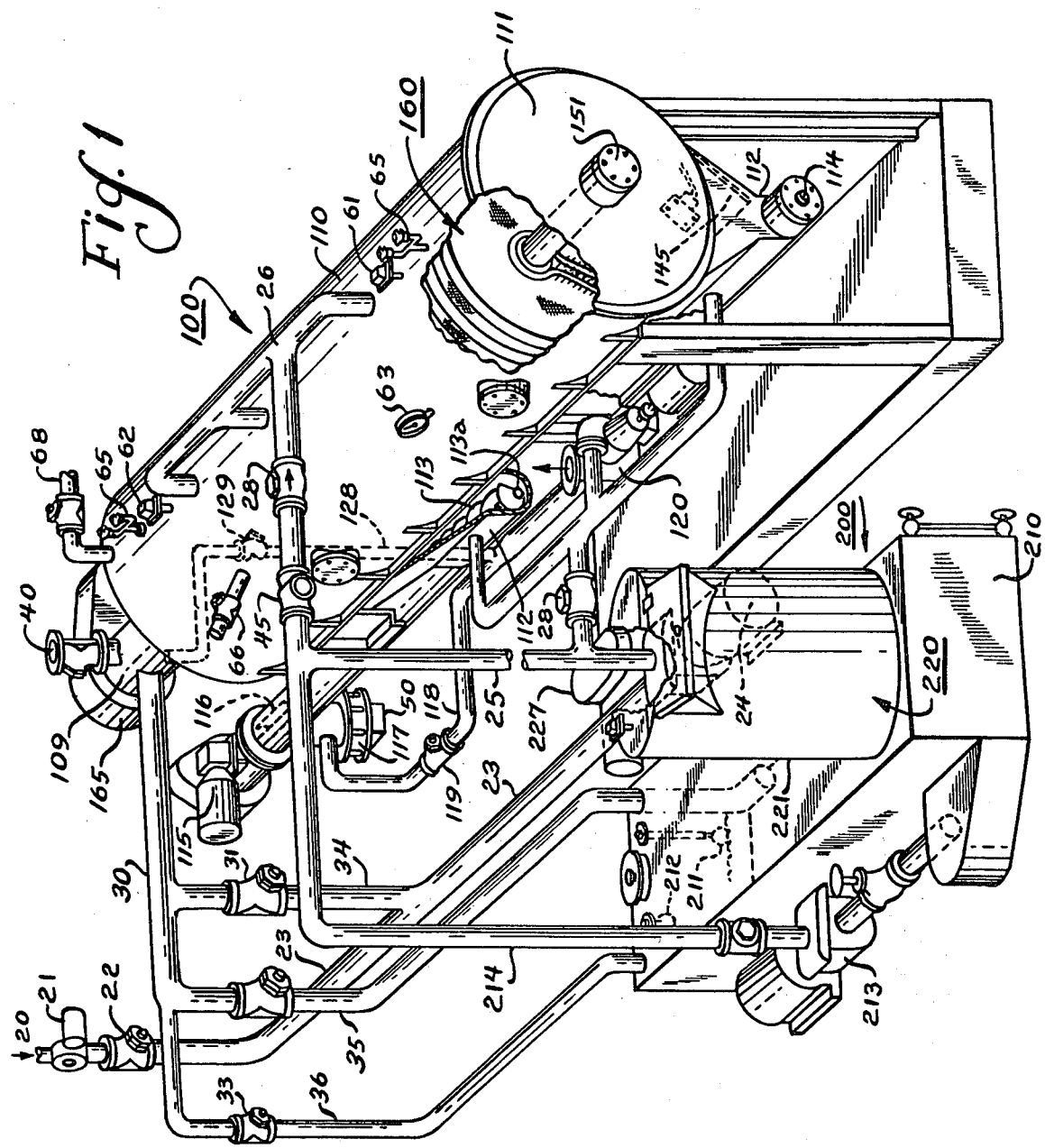

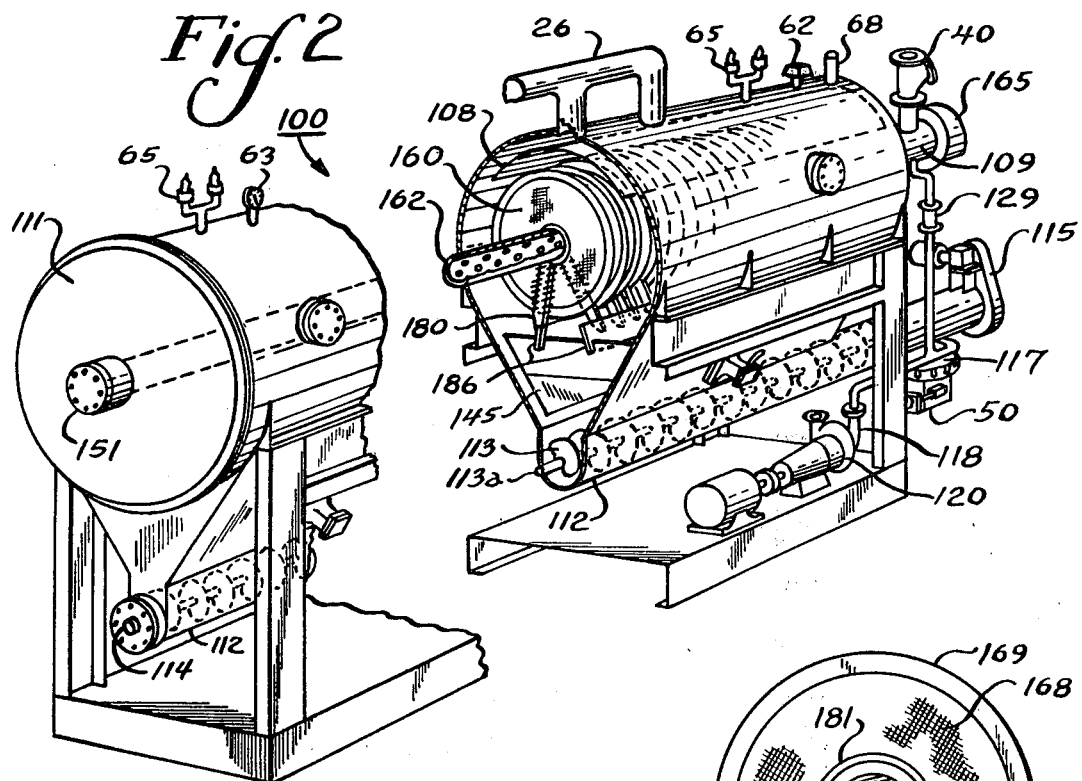
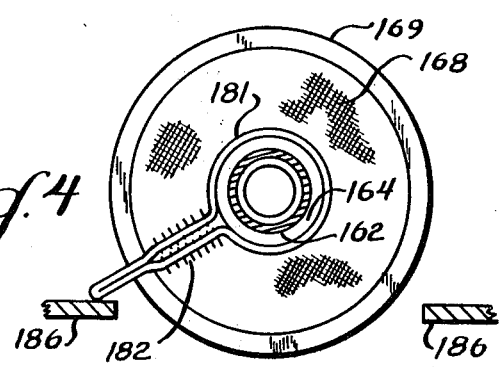
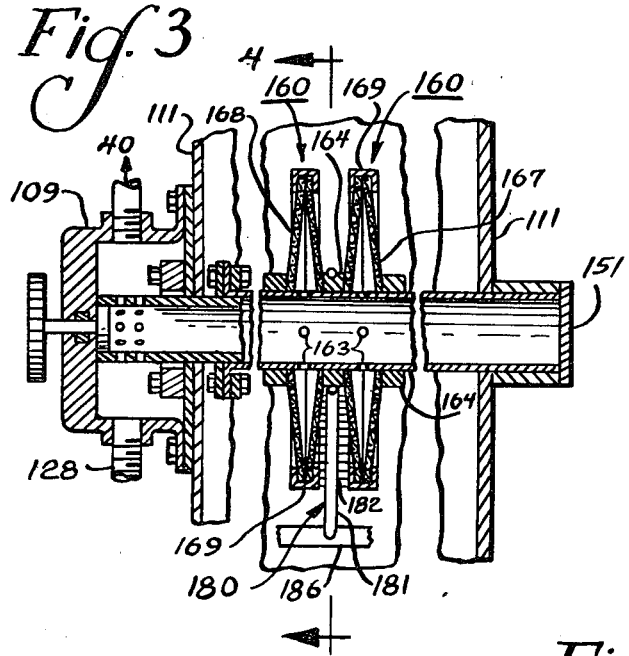
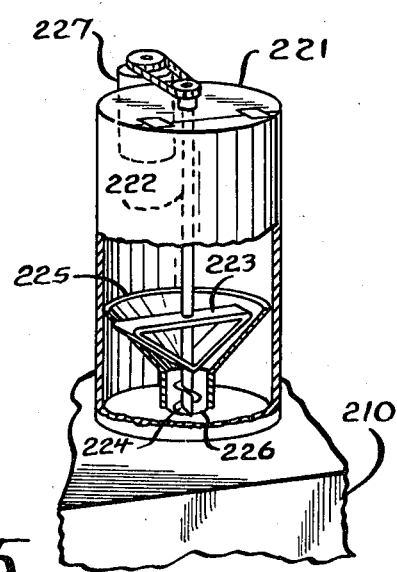

VERTICAL FILTER SYSTEM

This is a continuation of application Ser. No. 809,119, filed June 22, 1977, now abandoned.

BACKGROUND OF THE INVENTION

This invention relates in general to an improved method of and apparatus for clarifying liquids and, in particular, to a filtration system especially adapted for use in processing edible oils. More specifically, but without restriction to the particular use which is shown and described, this invention relates to a vertical leaf filtration system which automatically cleans the filter elements upon accumulation of a predetermined amount of materials from the influent without opening the filter chamber and maintains filter cake integrity during precoating and drying of the expended filter cake and accumulated materials.

While the instant invention has many applications, it is especially useful in process filtration of edible oils and for convenience of illustration will be described with reference to its use in edible oils processing. As is well known, seeds such as soybeans, cotton seeds, peanuts, and others, as well as animal fats such as tallow, lard, and others, contain sufficient quantities of vegetable oils and animal fats to justify commercial recovery and processing for edible and other industrial uses. In such processing, the oil or fat is removed from the oil bearing material by extraction with solvents such as hexane, alcohol, acetone, furfural, or other such suitable solvent, by such equipment as an expeller, press, or a combination thereof. The oil, or miscella, thereby removed is clarified by passing through filters which separate the liquid from the solid for the recovery and processing of the oil.

In some applications it is desirable to degum the crude oil to remove the water and soluable phosphatides, gums, etc. In such applications the crude oil is treated with water and phosphoric acid, or any other suitable reagent, to precipate the gums. While these precipated gums are presently removed by centrifuge, with a suitable filtration system the gum removal would be more complete. The degummed oil is then treated for the reduction of the free fatty acids. The more complete the removal of the gum, phosphatides, etc., the better the recovery of the free fatty acids reduced by physical refining. However, if the gums are not completely removed, or if there is no degumming, the gums in the free fatty acids must be removed by caustic neutralization of the free fatty acids with a slight caustic excess. Such caustic neutralization hydrates the gum and converts the free fatty acids to soaps which are subsequently removed by a centrifuge. The refined, or neutralized and degummed oil (which desirably has a free fatty acid content below 0.05%) is treated with bleaching agents (earth) under heat and vacuum to reduce the color. These bleaching agents are then removed by filtration.

If it is desirable to lower the melting point of the oil, the oil is hydrogenated by bubbling hydrogen gas through the oil in the presence of a catalyst. While nickel has been found to be a suitable catalyst, it is difficult to remove the nickel from the oil requiring some filter aid material to be added to the material to facilitate catalyst removal. This nickel catalyst and filter aid is subsequently removed by filtration and the oil post bleached—a process referred to as re-bleaching after hydrogenation. The bleaching agent, generally a neutral earth, is then removed from the oil by filtration along with any residual catalyst.

The edible oil may then be further processed, such as by winterizing and/or deodorizing, which require filtration to insure the removal of all the solids from the oil. After deodorizing a final processing step, filling, is effected wherein the liquid ingredients are filtered to remove foreign materials.

In the various filtration steps required in edible oil processing, the filtration systems heretofore employed were such that the filter apparatus had to be disassembled whenever the filter elements required cleaning for removal of the accumulated sludge or accumulant bearing expended filter cake. Such disassembly released vapors, which were sometimes toxic, into the atmosphere in the presence of the system operators and others creating an undesirable and sometimes hazardous working environment. The filter elements were then removed from the filter chamber and the filter septum scraped by hand which frequently resulted in damage to the filter elements by puncturing or distorting the filter cloth wire mesh septum. Once cleaning had been accomplished, the filter elements had to be reassembled within the filter chamber and frequently were not properly sealed. Such improper sealing in combination with the puncturing or distorting of the filter septum frequently resulted in influent contaminating the filtrate. In an attempt to minimize this problem, fiber filter aids were used with the precoat filter aids to create a proper seal and to attempt to maintain septum integrity. The use of such fiber filter aids is very costly and the necessity to effect such seals results in a very xpensive and inefficient filtration system.

SUMMARY OF THE INVENTION

It is, therefore, an object of this invention to improve filtration systems.

Another object of this invention is to maintain the integrity of filter cake formed on large filter septum during precoat and filtration.

A further object of this invention is to maintain the integrity of filter cake during draining of the filter chamber in preparation for removal of the expended filter cake and accumulants from the filter septum.

Still another object of this invention is to automatically maintain the filter elements clean for optimum system efficiency without removing the filter elements from the filter chamber.

Yet another object of this invention is to provide a dry waste or sludge discharge without heating the waste or discharge materials.

These and other objects are attained in accordance with the present invention wherein there is provided a filtration system utilizing a plurality of coaxial, vertically disposed, filter elements for clarifying a liquid passed therethrough. Upon the accumulation of a predetermined amount of materials on or in the filter cake, the filter chamber is sealed and the contents drained creating a pressure differential across the filter elements to maintain the integrity of the filter cake on the filter septum. After the contents of the filter chamber have been drained, the chamber is positively pressurized to remove any filtrate remaining in the filter cake and to dry the filter cake on the filter septum prior to removal. The expended filter cake and accumulants are removed from the filter septum and conveyed from the filter chamber by a discharge system. The filter chamber is filled with liquid and the filter septum mechanically scrubbed to remove any residual materials therefrom. A quantity of precoat or filter aid material is added to the liquid in the filter chamber and the filter aid bearing liquid circulated through the filter elements and the filtration system in a closed loop to form a precoat filter cake on the filter septum. The flow rate of the circulation is sufficient to maintain the integrity of the filter cake so formed until such time as the filter cake removes a sufficient amount of accumulants from the influent to create a predetermined pressure differential thereacross which will maintain the integrity of the filter cake on the filter septum at the influent flow rate.

DESCRIPTION OF THE DRAWINGS

Further objects of the invention, together with additional features contributing thereto and advantages accruing therefrom, will be apparent from the following description of a preferred embodiment of the invention which is shown in the accompanying drawings with like reference numerals indicating corresponding parts throughout, wherein:

FIG. 1 is a perspective view of a filtration system embodying the invention with portions of the internal structure of the filter chamber removed and shown in phantom for greater clarity;

FIG. 2 is a frontal perspective view of a portion of the filtration system shown in FIG. 1 with parts removed and portions broken away to better illustrate the internal structure of the filter chamber;

FIG. 3 is an enlarged sectional view of the vertical filter elements within the filter chamber to better illustrate the manner in which the expended filter cake and accumulants are removed from the filter septum;

FIG. 4 is a sectional view of the filter elements shown in FIG. 3; and

FIG. 5 is a perspective view of a portion of the precoat unit with portions broken away to better illustrate the internal structure thereof.

DESCRIPTION OF THE PREFERRED EMBODIMENT

Referring now to FIG. 1, there is shown a filtration system including a filtration unit 100 and a precoat unit 200. The two units are connected in fluid communication with a source of influent 20 by means of interconnecting valve-controlled piping. A filtrate and a solid waste materials discharge outlets 40 and 50, respectively, are provided to remove liquid and solids material from the units, all of which will be hereinafter described in greater detail.

Unclarified liquid or influent is pumped into the filtration system through influent inlet 20 by means of an inlet pump 21 which may be of any suitable commercially available type. The influent is pumped through pneumatically controlled valve 22 in an influent inlet line 23, through a serially coupled filter pump 24 (whose function will be hereinafter discussed in greater detail), through a filter pump discharge conduit 25 for delivery into the filter unit 100 through an upper filter inlet manifold 26 and a lower filter inlet manifold 27. Suitable check valves 28 are provided in the fluid connections from the filter pump discharge conduit 25 to the inlet manifolds 26 and 27 to prevent reverse flow of the influent.

The filter unit 100 includes a filter chamber 110 enclosed at both ends by covers 111 which are removably sealed to facilitate servicing of the internal mechanism, such as replacing worn parts. A trough 112 is formed in the bottom of the filter chamber 110 and through suitable support journals a rotatably driven discharge auger 113 in bearings 114. A discharge auger drive motor 115, when activated, rotates the discharge auger 113 to forward solids materials falling into the trough 112 to the discharge outlet 50 whereat impellers 116 secured to the auger shaft 113a compress the solids materials within a pneumatically controlled butterfly valve 117 which is periodically opened to discharge the solids materials from the system through the discharge outlet 50. Any liquid removed by the compressing action passes through a filter chamber drain conduit 118 (through which the contents of the filter chamber are drained) and a pneumatically controlled valve 119 to a filter drain pump 120.

Unclarified liquid which is delivered into the filter chamber 110 through the upper and lower inlet manifolds 26 and 27, respectively, is passed through coaxial vertical filter elements 106 into a hollow filter tube 162 and out through the filter outlet 40 or through filtrate discharge line 30 to be passed through pneumatically controlled valves 31, 32 or 33 depending upon the phase cycle of system operation, to be hereinafter discussed in detail.

The filter elements 160 are mounted coaxially upon the filter tube 162 and separated by a plurality of spacers 164 such that perforations 163 formed in the filter tube 162 are in communication with the interior of the filter disc as best shown in FIG. 3. The hollow filter tube 162 is rotatably mounted in a suitable sealed bearing 151 secured to one end 111 of the filter chamber 110 and in another sealed bearing in the filter outlet housing 109 at the opposite end. The filter tube 162 is closed at both ends and has perforations 163 formed therein in communication with the interior of the filter elements 160 through which the clarified liquid passes to be discharged (40) from the filter unit.

Each filter element 160 comprises a support structure or spacer 167 covered with a fine mesh screen or septum 168. The support structure 167 supports the fine mesh screen or septum 168 in an outwardly tapering manner from the center of the element to the outer edge. The filter cloth or fine mesh screen or septum 168 covering the support structure 167 is of a mesh size such that all solid particles suspended in the liquid of a size at least approximately 47 microns are retained on the screen when liquid is pumped through the filter element. However, the mesh size will be dependent upon the particle size of the filter aid used and the particle size of the suspended contaminants. The outer periphery of each of the filter elements 160 has a metallic rim 169 fixed thereon that slightly overlaps the screen or septum and seals the outer periphery of each filter element 160.

A plurality of wipers 180 are positioned between the filter elements 160 to clean the outer surfaces thereof. The wipers 180 are each supported on a spacer 164 which separates the individual filter elements so that each wiper is in contact with the opposing face of two adjacent filter elements. A filter element drive motor 165 is operatively connected to filter tube 162 to rotate the tube. When the filter elements 160 are thereby rotated relative to the wipers 180 (during a portion of the phase cycle of system operation to be hereinafter described in detail) the relative motion between the wipers and the filter elements 160 will cause the entire surface of each filter element to be subjected to the wiping action.

Each of the wiper elements 180 includes an arm portion 181 to which brush fibers 182 are appropriately secured. The wiper arm 181 extends radially outward from the filter tube 162 and about the spacer element 164 to be supported thereby. A pair of stops 186 are appropriately secured to the internal walls of the filter chamber 110 to prevent the wipers from rotating when the filter tube 162 and the filter elements 160 are rotated. Therefore, the wipers 180 will remain stationary and the brush fibers 182 will mechanically scrub the entire surface of the filter elements 160 when the filter element drive motor 165 is actuated.

It has been found that a speed of rotation such that the relative movement between the brush fibers and the filter elements 160 should be no greater than 1,000 inches per minute and preferably between approximately 200 and 400 inches per minute to cause the filter cake to be removed from the filter septum 168.

For a better understanding of the invention, the phase cycles of system operation of the filtration system will now be set forth at which time additional structural features will be described in detail.

Upon initial start up, both the filtration unit 100 and the precoat unit 200 are emptied of any liquid, and the filter elements 160 do not have any filter cake formed on the filter septum 168. Influent pump 21 and filter pump 24 are actuated pumping in influent from the inlet 20 through open pneumatically controlled valve 22 in influent inlet line 23, through filter pump 24, filter pump discharge line 25, through inlet manifolds 26 and 27, and into the filter chamber 110. A curved baffle plate 108 is supported within the filter chamber 110 at the point of influent discharge from the upper manifold 26 to prevent the influent from discharging directly onto the filter elements 160.

When influent fills the filter chamber 110, the influent flows through the filter elements 160 into the filter outlet housing 109, through filtrate discharge line 30, through pneumatically controlled valve 31 in recirculation line 34, and through pneumatically controlled valve 33 in liquid make-up line 36. Influent will continue to flow through liquid make-up line 36 until such time as a predetermined liquid level is obtained in a precoat tank 210 at which time a liquid level control 212 will be actuated to close the open pneumatically controlled valve 33 thereby terminating flow through the liquid make-up line 36. Liquid does not flow through precoat fill line 35 until such time as filter aid material is added for the formation of the precoat filter cake hereinafter discussed in detail.

When the filter chamber 110 and the precoat tank 210 have been filled with influent, the filtration system is ready to begin the precoat phase cycle of system operation. To initiate precoating the septum 168 of the filter elements 160, the pneumatically controlled valve 22 is closed and a precoat pump 213 and the filter pump 24 are energized to circulate the liquid from the precoat tank 210 through the precoat pump 213, precoat pump discharge line 214, through the upper filter inlet manifold 26 into the filter chamber 110. When the precoat pump 213 is energized, the pneumatically controlled valve 32 in precoat fill line 35 opens allowing liquid to be circulated therethrough from the filtrate discharge line 30 to the precoat tank 210. The circulating liquid passes through the filter elements 160, the filter tube 162, through the filtrate discharge line 30, the recirculation line 34, and the liquid make-up lines 36 since energization of the precoat pump 213 will lower the liquid level of the liquid contained within the precoat tank 210 thereby opening the pneumatically controlled valve 33 in response to a second liquid level controller 211. Energization of the filter pump 24 will draw the liquid through the recirculation line 34, through the filter pump 24, into the filter pump discharge line 25 and into the upper and lower filter inlet manifolds 26 and 27, respectively.

While the liquid is being circulated through the system in this closed loop manner, dry filter aid or precoat material is added to the liquid contained in the precoat tank 210 by means of a filter aid feeder 220. The filter aid feeder 220 comprises a hopper 221 having a shaft 222 extending longitudinally within the feed hopper and having secured thereto an agitator 223 and feed auger 224. The bottom of the hopper 225 is formed in a conical shape and secured within the hopper chamber 221 to prevent any of the precoat or filter aid material contained therein from being discharged except through an outlet 226 in the bottom of the cone. The shaft 222 is suitably journaled in bearing surfaces and brackets secured to the walls of the filter aid hopper 221 on the bottom and in the top of the hopper for rotation by means of a precoat feeder drive motor 227 mechanically connected to the shaft 222 such that upon energization of the feeder drive motor 227, the shaft 222, agitator 223, and feed auger 224 will rotate. Due to the gearing and pitch of the feed auger 224, a controlled, premeasured amount of filter aid material or media contained in the hopper 221 is added into the precoat tank 210. The turbulence of liquid passing through the precoat tank 210 causes a slurry to be formed in the precoat tank which is pumped by the precoat pump 213 through the precoat pump discharge line 214 to be circulated through the filtration system in a closed loop.

When the desired amount of filter aid material, or media, has been added to the precoat tank 210, the precoat feeder drive motor 227 is deenergized, but the precoat pump 213 continues to operate circulating the contents of the precoat tank 210 to the filter chamber 110, through the filter elements 160, and returning into the precoat tank or passing through the filter pump 24 for recirculation through the filter chamber 110. Actuation of both the precoat pump 213 and the filter pump 24 provides a high flow rate of circulation through the filter chamber 110 and the filter elements 160 which quickly forms a uniform filter cake precoat on the septum 168 of the filter elements 160. The filter aid material added to the liquid is circulated in the closed loop to adhere to the filter septum 168 forming the desired filter cake precoat. The liquid continues to be circulated in the closed loop until a sight glass 45, positioned in the discharge line to the upper filter inlet manifold 26, appears completely cleaned and polished indicating that all of the filter aid material has been removed from the liquid and collected on the filter septum to form a complete filter precoat on the filter elements 160.

When the filter septum 168 of the filter elements 160 have been precoated, the influent pump 21 is energized and the pneumatically controlled valve 22 opens delivering liquid influent through inlet 20. Since the liquid level in the precoat tank 210 is at the desired level from the precoating phase cycle of operation, the pneumatically controlled valve 33 is closed by operation of the liquid level controllers 212. Precoat pump 213 is deenergized, valve 32 is closed and the valve associated with the filter outlet 40 is opened to allow filtrate to be removed from the filter chamber 110.

After precoating has been completed and in order to maintain the integrity of the precoat on the filter septum 168, the filter pump 24 is energized during a initial portion of the filtration cycle to maintain a sufficient pressure differential across the filter cake to prevent the filter cake from slipping on the filter septum 168. In order to maintain this increased flow rate, the pneumatically controlled valve 31 is opened allowing the filtrate which passes through the filter elements 160 to be recirculated to filtrate discharge line 30, recirculation line 34, and back into influent inlet line 23 to be delivered to the filter pump 24 for return into the filter chamber 110. The unclarified liquid passing through the inlet 20 into the influent inlet line 23 is joined by the recirculating filtrate from recirculation line 34 and the serial connection of the influent pump 21 and the filter pump 24 maintains a higher rate of flow through the filter elements 160 in order to maintain a predetermined pressure differential across the filter cake of the filter elements 160. As the unclarified influent is passed through the filter elements 160 the pressure across the filter elements increases due to the removal of materials from the influent which accumulate on or in the filter cake.

After a predetermined amount of accumulants are entrained in or on the filter cake, a pressure differential is created between the pneumatically controlled valves 31 and 22. If this pressure differential were allowed to increase sufficiently, a back flow of unclarified liquid could enter the filter outlet housing 109 through the pneumatically controlled valve 31 in the recirculation line 34. Therefore, when the pressure across the filter elements 160 reaches a predetermined point, a pressure sensitive switch 61 is activated to close the pneumatically controlled valve 31 to prevent any unclarified liquid from flowing up the recirculation line 34 into the filter outlet housing 109. The closing of pressure switch 61 also terminates operation of the filter pump 24 so that filtration will proceed at the flow rate determined by the inlet or influent pump 21.

Filtration then continues until such time as the pressure drops across the filter elements 160 rises to a level determined by pressure responsive switch 62 which is actuated in response to the pressure indicated on a pressure gauge 63. When such pressure is reached, the filtration cycle is interrupted in order to drain the contents from the filter chamber 110, clean the expended filter cake and accumulants from the filter elements 160, and discharge the solids materials from the filter chamber 110 in preparation for precoating the cleaned filter septum 168 and automatically returning the filtration system for further filtration operation.

As solids materials are separated from the influent and accumulate on the septum supported filter cake and dissolved gaseous materials are adsorbed by the filter cake material, these accumulants increase the pressure differential across the filter elements until such time as the filter cake is expended and the accumulants must be removed from the filter elements 160 in order to continue efficient filtration of the influent. When the filtration phase cycle of operation is ended due to expending the filter cake, the influent pump 21 and filter pump 24 are deenergized and influent valve 22 is closed, the filter drain pump 120 is actuated and normally closed pneumatically controlled valves 119 and 129 are opened for draining the entire liquid contents of the filter chamber 110. The contents of the filter chamber 110 may be pumped to a holding tank for introduction back into the influent line or into any other suitable reservoir.

In order to prevent the filter cake from slipping during draining, the drain pump 120 must be sized sufficiently to create a pressure differential across the filter elements 160 to compress the expended filter cake into the filter septum 168. Vacuum breakers 65 are provided on the filter chamber 110 to permit the rapid withdrawal of the contents of the filter chamber to create this pressure differential. The liquid contained in the chamber is drained through the trough 112 and through a filtrate drain line 128 which is connected between the filter outlet housing 109 and the drain line 118 with the pneumatically controlled valve 129 positioned therebetween. Liquid passing through the filter elements 160 into the filter outlet housing 109 passes through the pneumatically controlled valve 129 carried in the filtrate drain line 128 and is passed into the drain line 118. The liquid contained in the filter chamber 110 which is not passed through the filter elements 160 is drained through the drain line 118 which is in fluid communication with the trough 112. During this drain sequence, all valves are automatically closed except the two drain valves 119 and 129. When the contents of the filter chamber 110 have been drained, valves 119 and 129 are closed and an air injection valve 66 and the filter outlet valve 40 are opened allowing air or other gas to enter and pressurize the filter chamber 110 driving any liquid entrapped in the filter cake out through the filter cake into the filter tube 162 and thereby drying the filter cake material to obtain additional filtrate product recovery and to maximize the filter cake dryness prior to removal from the filter septum 168 and discharge from the filter chamber 110.

When the contents of the filter chamber 110 have been drained and the pressurized air introduced into the chamber 110 has driven the residual liquid through the filter cake, the filter cake is compressed on the septum, dried, and ready to be removed from the filter chamber 110. The filter drive motor 165 is energized, rotating the filter tube 162 and the filter elements 160 against the stationary brush or wipers 180. Rotation of the filter elements 160 against the wipers 180 will cause the expended filter cake and accumulants to be removed from the filter septum 168 and dropped downwardly into the trough 112 whereat the rotating auger 113 will convey these materials from the filter chamber 110.

In order to assure complete discharge of the filter cake and accumulants and to avoid any buildup in the transition area between the cylindrical filter chamber 110 and the trough portion 112, vibratory side plates 145 are supported from a portion of the filter chamber 110 such that the materials removed from the filter septum 168 will fall onto the vibratory side plates 145 which, through a vibratory action, will convey the material downwardly into the trough 112 for removal by the auger 113. As the discharge auger 113 is rotated, the expended filter cake material and accumulants are conveyed outwardly from the filter chamber 110 through a pneumatically controlled butterfly valve 117 for disposal. After a predetermined time period when the materials have been removed, the filter drive motor 165 and the discharge auger drive motor 115 are deenergized and butterfly valve 117 is closed.

When the expended filter cake and accumulants are discharged from the filter chamber 110, a certain amount of liquid loss occurs which causes the liquid level in the precoat tank 210 to lower. When this occurs the tank is filled to the proper level by the actuation of the liquid level control 211 which opens valve 33 to allow enough filtrate to enter through liquid make-up line 36 to raise the liquid level in the precoat tank 210 to the desired level determined by controller 212.

It has been found that when the expended filter cake and accumulants are in a semi-dry state, the wipers 180 positioned between each filter element 160 do not completely clean the filter septum 168 sufficiently for use in some applications such as in edible oil processing. Therefore, after the filter chamber 110 has been emptied of the solids materials and the discharge operation terminated, the filter chamber 110 is again filled with liquid. This refilling may be done by reintroducing the liquid which has been previously drained from the filter chamber 110 into holding tank, or it may be done by energizing the influent pump 21 and the filter pump 24 to introduce influent through inlet 20 to fill the filter chamber 110 with influent in the manner previously described.

After a predetermined time period to insure that the filter chamber 110 has been completely filled, the inlet pump 21 and filter pump 24 are stopped and the filter drive motor 165 is energized. The filter elements 160 are rotated against the stationary wipers 180 to achieve a thorough cleaning of the septum 168 by scrubbing the septum against the wipers 180 while immersed in the liquid contained in the filter chamber 110. After a predetermined time period the filter drive motor 165 is deenergized and the filtration system is now ready to again enter the precoat phase cycle of operation previously described.

While the invention has been described with reference to a preferred embodiment, it will be understood by those skilled in the art that various changes may be made and equivalents may be substituted for components thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. Apparatus for clarifying a contaminated liquid by removing and accumulating the contaminants therefrom, and automatically discharging the contaminants so accumulated comprising
    container means for retaining contaminated liquid having suspended and dissolved contaminants therein,
    filter means having a filter septum for supporting filter cake material,
    said filter means being supported within said container means for removing and accumulating suspended and dissolved contaminants from the liquid retained in said container means and discharging clarified liquid therefrom,
    condition responsive means actuable in response to the accumulation of a predetermined quantity of contaminants by said filter means for interrupting the removal and accumulation of contaminants from the contaminated liquid contained in said container means and the resultant discharge of clarified liquid therefrom,
    draining means for removing the liquid in said container means and actuable in response to the interruption of the removal and accumulation of contaminants from the contaminated liquid contained in said container means and the resultant discharge of clarified liquid therefrom operatively connected to said container means for withdrawing at least a portion of the contaminated liquid from said container means through said filter means at a rate sufficient to prevent the separation of the contaminant bearing filter cake from said filter septum,
    pressurizing means in fluid communication with said container means for maintaining a pressure differential through the filter cake and actuable to introduce a positive gaseous pressure into said container means passing said pressurized gas through said filter means for removing a portion of any liquid contained therein and drying the contaminant bearing filter cake supported on the filter septum,
    cleaning means supported within said container means in operative contact with said filter means and actuable for removing at least a portion of the contaminant bearing filter cake from the filter septum and conveying said contaminant bearing filter cake removed from the filter septum out from said container means,
    means for refilling said container means with liquid and actuating said cleaning means to scrub the filter means in the liquid to remove any residual contaminant bearing filter cake remaining on the filter septum of said filter means after at least a portion of the contaminant bearing filter cake has been removed, and
    precoat forming means for adding a predetermined quantity of precoat filter cake forming material to said liquid to form a precoat slurry through said filter means to form a precoat filter cake on the cleaned filter septum.

2. The apparatus of claim 1 wherein said cleaning means actuable for removing at least a portion of the contaminant bearing filter cake from the filter septum removes substantially all of the filter cake to expose the filter septum prior to refilling said container to scrub the filter means in liquid.

3. The apparatus of claim 1 further including means for simultaneously recirculating clarified liquid discharged from said filter means through said precoat filter cake formed on the cleaned filter septum and unclarified contaminant bearing liquid to establish a predetermined pressure differential thereacross for maintaining the integrity of the precoat filter cake.

4. The apparatus of claim 3 further including means actuable in response to the establishing of a predetermined pressure differential across the precoat filter cake to terminate the recirculation of the clarified liquid discharged through said precoat filter cake and thereby discharge the clarified liquid from said container means.

5. A method of clarifying a liquid bearing suspended and dissolved contaminants by removing and accumulating the contaminants from the liquid and disposing of the accumulants so removed comprising the sequential steps of
    passing an unclarified contaminant bearing liquid through filter means carried within a contaminated liquid retaining container and including a contaminant accumulating filter cake supported by a filter septum, discharging from the container clarified liquid passed through the filter means and accumulating contaminants on or in the filter cake supported by the filter septum, interrupting the passing of unclarified contaminant bearing liquid to the filter means upon the accumulation of a predetermined amount of contaminants, draining at least a portion of the unclarified contaminant bearing liquid from the container through the filter means at a flow rate sufficient to prevent separation of the contaminant bearing filter cake from the filter septum, drying the contaminant bearing filter cake supported on the filter septum by introducing a pressurizing gas into the container and passing the pressurized gas through the contaminant bearing filter cake thereby removing a portion of the liquid contained therein and thereby maintaining a pressure differential across the filter cake, removing at least a portion of the contaminant bearing filter cake from the filter septum and conveying the contaminant bearing filter cake removed from the filter septum out from the container, refilling the container with liquid and scrubbing the filter septum to remove any residual filter cake remaining thereon after at least a portion has been removed therefrom to expose the filter septum, adding a predetermined quantity of precoat filter cake forming material to the liquid contained within the container after scrubbing to expose the filter septum to form a precoat slurry and circulating the precoat slurry through the filter means to form a precoat filter cake on the scrubbed filter septum, and resuming passing unclarified contaminant bearing liquid through the filter means carried within the contaminated liquid retaining container.

6. The method of claim 5 wherein said step of removing at least a portion of the contaminant bearing filter cake from the filter septum removes substantially all of said filter cake prior to refilling the container with liquid and scrubbing the filter septum.

7. The method of claim 6 wherein said step of removing substantially all of said filter cake includes brushing said filter cake within the drained container means until the filter septum is exposed prior to refilling the container with liquid and scrubbing the filter septum.

8. The method of claim 5 wherein the step of adding a predetermined quantity of precoat filter cake forming material to the liquid contained within the container and circulating the precoat slurry to form a precoat filter cake on the cleaned filter septum comprises simultaneously recirculating the filtrate passed through the precoat filter cake formed on the scrubbed filter septum and resuming passing unclarified contaminant bearing liquid through the filter means carried within the contaminated liquid retaining container to establish a flow rate through to precoat filter cake formed on the filter septum to maintain a predetermined pressure differential thereacross for maintaining the integrity of the precoat filter cake until a uniform precoat filter cake has been formed on the filter septum.

* * * * *